United States Patent [19]

Braun et al.

[11] 4,296,226
[45] Oct. 20, 1981

[54] VINYL POLYMER WITH ACETYLACETOXY GROUPS, PROCESS FOR ITS MANUFACTURE AND AN AGENT OBTAINED THEREOF

[75] Inventors: Helmut Braun, Kriftel; Helmut Rinno, Hofheim am Taunus; Karl J. Rauterkus, Kelkheim, all of Fed. Rep. of Germany

[73] Assignee: Hoechst Aktiengesellschaft, Frankfurt am Main, Fed. Rep. of Germany

[21] Appl. No.: 167,052

[22] Filed: Jul. 9, 1980

[30] Foreign Application Priority Data

Jul. 11, 1979 [DE] Fed. Rep. of Germany ....... 2927932

[51] Int. Cl.$^3$ .................. C08F 16/38; C08F 216/38
[52] U.S. Cl. ........................... 526/316; 260/29.6 R; 526/333; 560/178; 568/303; 568/322
[58] Field of Search ............. 260/29.6 R; 560/178; 568/303, 322; 526/316, 333

[56] References Cited

U.S. PATENT DOCUMENTS 3,530,167 9/1970 Dowbenko ........................... 526/333
3,607,834 9/1971 Marx et al. .......................... 526/316
4,138,393 2/1979 Lindner ............................... 526/316

FOREIGN PATENT DOCUMENTS 1161095 8/1969 United Kingdom ............... 526/316

*Primary Examiner*—John Kight, III
*Attorney, Agent, or Firm*—Curtis, Morris & Safford

[57] ABSTRACT

Vinyl polymers with acetylacetoxy groups form the basis of polymer dispersions which are used as binding agent dispersions in paints, particularly suitable vinyl polymers are obtained by polymerizing an acetylacetoxy compound together with a least one further olefinically unsaturated compound, while using as acetylacetoxy compound an allyl ether derivative of the formula

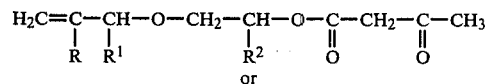

or

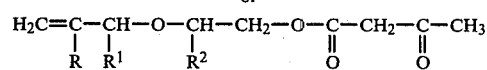

The copolymerization is carried out in particular in emulsion at a temperature in the range of from $-30°$ to $200°$ C. As comonomers there are used especially vinyl esters and (meth-)acrylic acid esters. The polymerization is commonly effected in the presence of a radical-forming initiator and optionally in the presence of emulsifiers and protective colloids.

5 Claims, No Drawings

VINYL POLYMER WITH ACETYLACETOXY GROUPS, PROCESS FOR ITS MANUFACTURE AND AN AGENT OBTAINED THEREOF

The invention relates to a vinyl polymer with acetylacetoxy groups, a process for its manufacture and an agent obtained thereof.

It is known that unsaturated acetoacetic acid esters are suitable comonomers in the polymerization of certain unsaturated compounds (cf. for example British Pat. Nos. 1,541,891 and 1,541,908). The copolymerization is carried out in an aqueous medium, so that an aqueous plastics dispersion is obtained. These plastics dispersions are used as binder dispersions in paints (cf. for example British Pat. No. 1,541,909).

It is the object of the present invention to provide a vinyl polymer having acetylacetoxy groups, which may be prepared from a monomer obtainable without excessively high costs and having at least one acetylacetoxy group, and which contains also units of another vinyl monomer.

The present invention provides a vinyl polymer having acetylacetoxy groups, which contains units of formula (I)

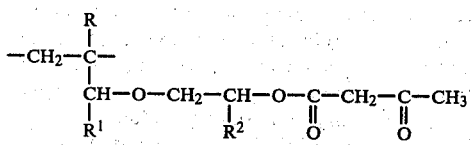

and/or of formula (II)

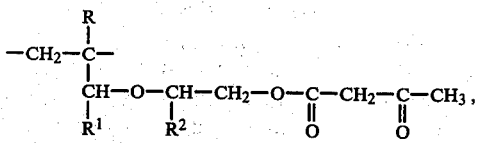

in which R is a hydrogen atom or a methyl group, $R^1$ is a hydrogen atom or an alkyl group having 1, 2 or 3 carbon atoms, and $R^2$ is a hydrogen atom or a hydrocarbon radical having from 1 to 8 carbon atoms and optionally containing one or several oxygen atoms or a halogen atom. The radical $R^1$ is preferably a hydrogen atom, whereas the radical $R^2$ stands preferably for (a) a hydrogen atom, (b) an alkyl group having 1, 2 or 3 carbon atoms which may contain a halogen atom, a hydroxyl group, an acyloxy group having from 3 to 6 carbon atoms or an acetylacetoxy group, or (c) for an aryl group having 6, 7 or 8 carbon atoms.

Hence, the invention relates in particular to a vinyl polymer having acetylacetoxy groups, which contains units of formula (III)

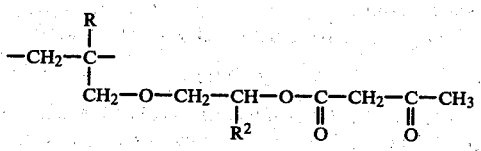

and/or of formula (IV)

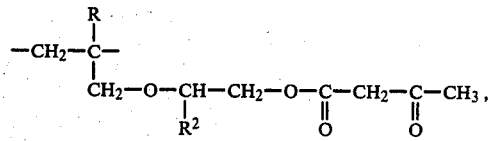

in which R is a hydrogen atom or a methyl group, and $R^2$ is (a) a hydrogen atom, (b) an alkyl group having 1, 2 or 3 carbon atoms, which may be substituted by a halogen atom, preferably a chlorine atom, a hydroxyl radical, an acyloxy radical having from 3 to 6 carbon atoms or an acetylacetoxy group, or (c) an aryl radical having 6, 7 or 8 carbon atoms, preferably a phenyl group.

Another subject of the invention is a process for the preparation of a vinyl polymer by polymerizing a polymerizable acetylacetoxy compound together with at least one further copolymerizable olefinically unsaturated compound under common conditions, which comprises using as acetylacetoxy compound an acetylacetoxyalkylallyl ether of formula (V)

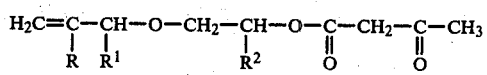

or of formula (VI)

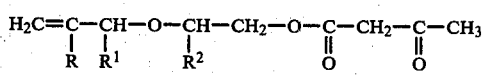

or a mixture of these ethers, in which R, $R^1$ and $R^2$ are defined as in formula (I).

According to the invention there is used especially an acetylacetoxyalkyl-allyl ether of formula (VII)

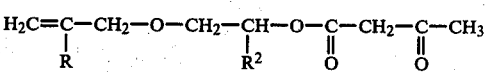

or of formula (VIII)

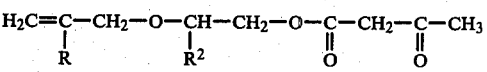

or a mixture of these ethers, in which R is a hydrogen atom or a methyl group, and $R^2$ is (a) a hydrogen atom, (b) an alkyl group having 1, 2 or 3 carbon atoms, which may be substituted by a halogen atom, preferably a chlorine atom, a hydroxyl radical, an acyloxy radical having from 3 to 6 carbon atoms or an acetylacetoxy group, or (c) an aryl radical having 6, 7 or 8 carbon atoms, preferably a phenyl radical.

Acetylacetoxyalkyl-allyl ethers used in accordance with the invention are, for example, [2-(acetylacetoxy)-ethyl]-allyl ether, [2-(acetylacetoxy)-ethyl]-methyallyl ether, [2-(acetylacetoxy)-ethyl]-1-methylallyl ether, [2-(acetylacetoxy)-ethyl]-1-ethylallyl ether, [2-(acetylacetoxy)-ethyl]-1-propylallyl ether, [2-(acetylacetoxy)-propyl]-allyl ether, [2-(acetylacetoxy)-propyl]-methallyl ether, [2-(acetylacetoxy)-propyl]-1-methylallyl ether, as well as [2-(acetylacetoxy)-2-chloromethyl]-ethyl-allyl ether, [2-(acetylacetoxy)-2-hydroxymethyl]-ethyl-allyl ether, [2-(acetylacetoxy)-2- phenyl]-ethyl-allyl ether, [2-acetyl-acetoxy)-2-p-tolyl]-ethyl-allyl ether, 2,3-bis(acetyl-acetoxy)-propyl-allyl ether, (2-acetylacetoxy-3-acryloyloxy-propyl)-allyl ether, (2-acetylacetoxy-3-methacryloyloxypropyl)-allyl ether, and the corresponding methallyl ethers.

The compounds used according to the invention and having at least one acetylacetoxy group may be prepared in various ways. For example, a Williamson synthesis may be carried out (a) with an alkali metal salt of an—optionally substituted—(2-hydroxyethyl)-acetoacetic acid ester and an—optionally substituted—allyl halide, or (b) in reverse order with an—optionally substituted—(2-halogenoethyl)-acetoacetic acid ester and an —optionally substituted—alkali-allyl alcoholate. Furthermore, it is possible to prepare first an—optionally substituted—allylglycol ether in analogous manner, to convert the same into the allylglycol-acetic acid ester and to react the latter via a Claisen condensation with acetic acid-ethyl ester.

The monomers used according to the invention may be prepared in a particularly easy and preferred manner by reacting at first an—optionally substituted—allyl alcohol with an epoxide and the resulting hydroxyalkyl-allyl ether with diketene. In this case the allyl alcohol employed is preferably an alcohol of formula (IX)

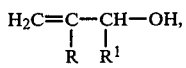

in which R and R$^1$ are defined as in formula (I). Suitable alcohols are preferably allyl alcohol itself and methallyl alcohol. Further examples are 1-methylallyl alcohol, 1-ethylallyl alcohol, 1-propylallyl alcohol, and 1,2-dimethylallyl alcohol. As epoxide there is used an epoxide of formula (X)

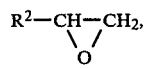

in which R$^2$ is defined as in formula (I). Particularly suitable epoxides are those of formula (X), in which R$^2$ is a hydrogen atom, an alkyl group having 1, 2 or 3 carbon atoms which may be substituted by a halogen atom, preferably a chlorine atom, a hydroxyl radical or an acyl radical having from 3 to 6, preferably 3 or 4, carbon atoms, or stands for an aryl radical having 6, 7 or 8 carbon atoms, preferably a phenyl group. Examples are especially ethylene oxide, propylene oxide, glycide, epichlorohydrin, styrene oxide and glycidyl esters, such as glycidyl acrylate, glycidyl methacrylate and glycidyl crotonate.

The reaction between the alcohol and the epoxide is carried out under common conditions, preferably in substance. The reaction temperature is in the range of from 0° to 120° C., preferably from 20° to 100° C. The reaction is commonly executed under normal pressure, however, in cases where one of the reactants is present in a gaseous form at the respective reaction temperature, the reaction may also be carried out at elevated pressure. It is performed in the absence of a catalyst or preferably in the presence of a catalyst to be used in an amount of from 0.01 to 2% by weight, preferably from 0.02 to 0.5% by weight (calculated on the total amount of the reactants). As catalysts there may be used in particular substances showing a strongly alkaline reaction, especially a) alkali metals, such as sodium, potassium and lithium, b) alkali metal alcoholates, preferably having from 1 to 4 carbon atoms, for example sodium methylate, sodium ethylate, sodium propylate, sodium-t-butylate and the analogous potassium compounds, and especially the alkali metal alcoholates of the unsaturated alcohols used in the respective case, such as sodium allyl alcoholate and sodium methallyl alcoholate, and c) aliphatic amines, preferably trialkylamines having from 3 to 9 carbon atoms, for example trimethylamine, triethylamine, triethanolamine, and cyclic amines, for example pyridine, piperidine, morpholine and piperazine. There are also suitable compounds with an acid reaction, especially inorganic acids, for example hydrochloric acid, sulfuric acid, nitric acid, phosphoric acid, as well as Lewis acids, for example boron trifluoride and phosphorus trichloride, which may also be employed in the form of their addition compounds, for example as etherates.

The hydroxyalkyl-allyl ether obtained in the first reaction step is reacted with diketene also under common conditions, preferably in substance, the reaction temperature being in the range of from 0° to 120° C., preferably from 20° to 100° C. The reaction is normally executed under normal pressure; but elevated pressure may also be applied. It is recommended to effect the reaction in the presence of a catalyst to be used in an amount of from 0.01 to 2% by weight, preferably from 0.2 to 0.5% by weight (calculated on the total amount of the reactants). As catalysts there may be used (a) acids, (b) acidic salts, (c) bases, or (d) basic salts, for example sulfuric acid, phosphoric acid, p-toluene-sulfonic acid, sodium hydrogenosulfate, triethylamine, triethanolamine and trimethyl ammonium acetate.

The preparation of the monomers having at least one acetylacetoxy group is illustrated by the following directions:

DIRECTION 1 a. 200 Milligrams of pure metallic sodium are added to 58.1 grams (1 mol) of allyl alcohol in a four-necked flask equipped with stirrer, thermomether, dropping funnel and reflux condenser, and the batch is brought to the boil (97° C.). Upon dissolution of the sodium, 61 grams (1.05 mols) of propylene oxide are added constantly, while stirring, to the boiling allyl alcohol within 2 hours. After a subsequent after-reaction period of 1 hour at 97° C. the reaction mixture is distilled at a pressure of 2 millibars. There are obtained 65 grams (55% of the theory) of 2-hydroxypropyl-(1)-allyl ether having a boiling point of 67° C. at 2 millibars and a refractive index $n_D{}^{20}=1.4355$.

b. 0.03 Gram of trimethylammonium acetate is added to 58.1 grams (0.5 mol) of 2-hydroxypropyl-(1)-allyl ether in the above-described reaction vessel, and the batch is heated to a temperature of 75° C. While maintaining this temperature, 42 grams (0.5 mol) of diketene are added dropwise to the mixture within 30 minutes, while stirring. After a subsequent after-reaction period of 1 hour at 75° C. the reaction mixture is cooled to room temperature. There are obtained 100 grams of 2-acetylacetoxypropyl-(1)-allyl ether as a slightly yellow liquid with a refractive index $n_D{}^{20}=1.4450$.

DIRECTION 2

A mixture of 1,320 grams (10 mols) of 2,3-dihydroxypropyl-(1)-allyl ether and 9 grams of metallic sodium is heated to 70° C. in a four-necked flask equipped with stirrer, thermometer, dropping funnel and reflux condenser, the sodium thus being dissolved, and while maintaining this temperature, 1,680 grams (20 mols) of diketene are constantly added, while stirring, within 2 hours. After a subsequent after-reaction period of 1 hour at 80° C. the reaction mixture is cooled to room temperature. There are obtained 3000 grams of 2,3-bis-(acetylacetoxy)-propyl-(1)-allyl ether as a yellow oil with a refractive index $n_D^{20} = 1.4625$.

The polymerization of the invention is carried out under common conditions in substance, in solution or preferably in emulsion. The polymerization temperature is in the range of from $-30°$ to $200°$ C., preferably from $20°$ to $100°$ C.

The monomer having at least one acetylacetoxy group is polymerized together with at least one olefinically unsaturated compound. The weight ratio of the acetylacetoxy monomer to the comonomer is in the range of from 1:200 to 1:10, preferably from 1:100 to 1:20.

Particularly suitable comonomers are olefinically unsaturated compounds of formula (XI)

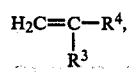

in which $R^3$ is a hydrogen atom or a methyl group, and $R^4$ represents (a) a hydrogen atom or an alkyl radical having from 1 to 5 carbon atoms, (b) a carbocyclic or heterocyclic radical having 5 or 6 ring members, (c) an alkoxy radical having from 1 to 4 carbon atoms, (d) an alkylcarboxy radical having from 2 to 18, preferably 2 to 10 carbon atoms, (e) nitrile group, (f) a halogen atom, preferably a chlorine atom, (g) a carboxyl group or sulfo group, (h) an alkoxycarbonyl radical having from 2 to 12, preferably from 2 to 9 carbon atoms, (i) an aminocarbonyl radical, or (k) a vinyl radical.

Suitable copolymerizable compounds of this kind are (a) olefins, for example ethylene, propylene and isobutylene, (b) styrene, N-vinyl pyrrolidone and vinyl pyridine, (c) vinyl ethers, e.g. vinyl methyl ether, vinyl ethyl ether and vinyl-n-butyl ether, (d) vinyl esters of aliphatic carboxylic acids having from 2 to 18, preferably from 2 to 10 carbon atoms, for example vinyl acetate, vinyl propionate, vinyl butyrate, vinyl pivalate, vinyl isononate vinyl laurate, and vinyl decanates, as well as vinyl esters of a mixture of monocarboxylic acids having from 9 to 11 carbon atoms, (e) acrylonitrile and methacrylonitrile, (f) vinyl halides, for example vinyl chloride and allyl chloride, (g) unsaturated monocarboxylic acids, e.g. acrylic acid, methacrylic acid and vinylsulfonic acid, (h) acrylic acid esters or methacrylic acid esters of monovalent alkanols having from 1 to 11, preferably from 1 to 8 carbon atoms, for example, methyl acrylate, ethyl acrylate, butyl acrylate, 2-ethylhexyl acrylate, methyl methacrylate, ethyl methacrylate, butyl methacrylate, hexyl methacrylate, octyl methacrylate, and 2-ethylhexyl methacrylate, (i) acrylic acid amides and methacrylic acid amides, for example, acrylic acid amide, N-methylolacrylic acid amide, methacrylic acid amide and N-methylolmethacrylic acid amide, and (k) diolefins having 4 or 5 carbon atoms, for example butadiene and isoprene. Appropriate comonomers are also maleic acid diesters and fumaric acid diesters, especially of monovalent alkanols having from 2 to 10, preferably from 3 to 8 carbon atoms, for example dibutyl maleinate, dihexyl maleinate, dioctyl maleinate, dibutyl fumarate, dihexyl fumarate and dioctyl fumarate.

Particularly suitable comonomers are the vinyl esters mentioned under (d) and the acrylic acid esters or methacrylic acid esters mentioned under (h).

When using two copolymerizable compounds for the preparation of terpolymers, the above-mentioned comonomers being particularly suitable are preferably employed, optionally in admixture with styrene or maleic acid diesters. Comonomer combinations of this kind are formed, for example, of an acrylic acid ester and a methacrylic acid ester, an acrylic acid ester and styrene, an acrylic or methacrylic acid ester and a vinyl ester, a vinyl ester and a maleic acid diester, as well as of a mixture of various vinyl esters, especially vinyl acetate and vinyl esters of a mixture of monocarboxylic acids having from 9 to 11 carbon atoms.

The polymerization is commonly carried out in the presence of a radical-forming initiator, preferably a peroxide compound or an aliphatic azo compound. Said initiator is oil-soluble or preferably water-soluble; it is employed in an amount of from 0.05 to 2% by weight, preferably from 0.1 to 1% by weight (calculated on the total amount of the monomers). There are suitable especially hydrogen peroxide, alkali metal salts or ammonium salts of the peroxydisulfuric acid or of peroxydiphosphoric acid, for example sodium peroxydisulfate, potassium peroxydisulfate and ammonium peroxydisulfate, furthermore alkyl hydroperoxides, such as t-butyl hydroperoxide, dialkyl peroxides, such as di-t-butyl peroxide, diacyl peroxides such as diacetyl peroxide, dilauroyl peroxide and dibenzoyl peroxide, as well as azodiisobutyric acid nitrile, azodicarbonamide and azo-$\gamma,\gamma'$-bis(4-cyanovaleric acid). The initiator is optionally used together with a reducing agent, especially with an alkali metal salt or alkaline earth metal salt of a sulfur-containing acid having a reducing effect; there are preferably suitable sulfites, bisulfites, pyrosulfites, dithionites, thiosulfates and formaldehyde sulfoxylates. There may also be used glucose and ascorbic acid.

The polymerization is optionally carried out in the presence of emulsifiers. There are employed non-ionic and/or ionic emulsifiers. The amount of non-ionic emulsifier is up to 6% by weight, preferably from 0.1 to 4% by weight, and that of the ionic emulsifier is up to 3% by weight, preferably from 0.1 to 2% by weight (each calculated on the total amount of the monomers). There is preferred a mixture of a non-ionic emulsifier and a ionic emulsifier.

As non-ionic emulsifiers there are especially suitable polyglycol ethers of long-chain aliphatic alcohols having preferably from 10 to 20 carbon atoms, or of alkyl phenols whose alkyl radical contains preferably from 6 to 12 carbon atoms, or of dialkyl phenols or trialkyl phenols whose alkyl radicals represent preferably branched alkyl radicals having from 3 to 12 carbon atoms each. Examples are reaction products of ethylene oxide with lauryl alcohol, stearyl alcohol, oleyl alcohol, coconut oil alcohol, octyl phenol, nonyl phenol, diisopropyl phenol, triisopropyl phenol, di-t-butyl phenol and tri-t-butyl phenol. Reaction products of ethylene oxide with polypropylene glycol or polybutylene glycol are also suitable.

Suitable ionic emulsifiers are especially anionic emulsifiers, in particular alkali metal salts or ammonium salts of alkyl sulfonates, aryl sulfonates or alkylaryl sulfonates as well as of the corresponding sulfates, phosphates or phosphonates which optionally show oxyethylene units between the respective hydrocarbon radical and the anionic group. Examples are sodium lauryl sulfate, sodium octylphenolglycol ether sulfate, sodium dodecylbenzene sulfonate, sodium lauryldiglycol sulfate, ammonium tri-t-butylphenolpentaglycol sulfate, and ammonium tri-t-butylphenoloctaglycol sulfate.

The process of the invention is optionally carried out in the presence of a common protective colloid. Suitable protective colloids are, for example, polyvinyl pyrrolidone, poly-N-vinyl acetamide, polyvinyl alcohol, copolymers of N-vinyl-N-methyl acetamide with acrylic acid esters or with maleic acid esters, furthermore cellulose derivatives, especially methyl cellulose, ethyl cellulose, hydroxyethyl cellulose and carboxymethyl cellulose, as well as gum arabic, starch and alginates. Preference is often given to mixtures of various protective colloids. The amount of protective colloid or of the protective colloid mixture is generally from 0.5 to 4% by weight, preferably from 0.6 to 2% by weight (calculated on the total amount of the monomers).

The polymerization process of the invention is carried out in substance or in solution or preferably in an aqueous medium. The resulting polymer dispersions show a solids content of from 20 to 70% by weight, preferably from 40 to 60% by weight.

The polymer dispersions obtained according to the invention are especially suitable as basis for paints showing a strongly improved wet adhesion on non-absorbent smooth surfaces as compared against conventional products. Furthermore, the resistance to weathering of the coats prepared with these paints and the mechanical abrasion resistance under the action of moisture are usually markedly increased.

The following Examples serve to further illustrate the invention. The symbol "%" means "percent by weight" in each case.

EXAMPLE 1

In a four-necked flask equipped with thermometer, dropping funnel, reflux condenser and stirrer, 3 grams of nonylphenol polyglycol ether having 30 oxyethylene units, 0.15 gram of sodium ethene sulfonate, 0.25 gram of sodium acetate and 2.5 grams of hydroxyethyl cellulose having an average molecular weight of 100,000 (average polymerization degree 400) are dissolved, while stirring at room temperature, in 98,7 grams of water. To this solution are added 7.5% of a mixture of 74 grams of vinyl acetate, 26 grams of a commercial mixture of decanoic acid vinyl esters and 2.5 grams of (2-acetylacetoxy-propyl)-allyl ether, and the resulting mixture is heated to 50° C. After adding 0.2 gram of ammonium peroxy disulfate dissolved in 5 grams of water, the temperature of the mixture is increased to 70° C. While maintaining this temperature, the remaining 92.5% of the above-mentioned monomer mixture are constantly added within 2.5 hours. Subsequently a solution of 0.1 gram of ammonium peroxydisulfate in 2.5 grams of water is added to the mixture which is then maintained for another hour at 70° C. and thereafter cooled to room temperature. The resulting polymer dispersion has a solids content of 50%.

EXAMPLE 2

In a four-necked flask equipped with thermometer, dropping funnel, reflux condenser and stirrer, a solution of 1.35 grams of 1-(isooctyl)-phenyl-2-$\beta$-(sodium-sulfonato)-ethyl-glycol (ISG) and 0.15 gram of ammonium peroxydisulfate in 290 grams of water is mixed, while stirring at room temperature, with 30% of an emulsion of 360 grams of water, 5 grams of ISG, 15 grams of methacrylic acid, 405 grams of butyl acrylate, 338 grams of methyl methacrylate, 22.5 grams of [2,3-bis-(acetylacetoxy)-propyl]-allyl ether and 1.35 grams of ammonium peroxydisulfate. The resulting mixture is heated to 75° C., and while maintaining this temperature, the remaining 70% of the above-mentioned emulsion, to which 22 grams of ISG have previously been added, are constantly added within 2.5 hours. Thereafter the mixture is maintained at 75° C. for another 2.5 hours, and after one hour as well as after two hours following the completion of the addition of the emulsion, a solution of 0.2 gram of ammonium peroxydisulfate in 5 grams of water is added in each case. Subsequently the mixture is cooled to room temperature. The resulting polymer dispersion has a solids content of 50%.

Example of application

From the dispersion obtained according to Example 1, a paint is manufactured in accordance with the following formulation:

| | | |
|---|---|---|
| a. | Water | 41.0 g |
| | 3% aqueous solution of a commercial hydroxyethyl cellulose | 15.6 g |
| | sodium polyphosphate | 0.4 g |
| | 30% aqueous solution of a commercial ammonium polyacrylate with a viscosity of about 200 mPa . s (according to Epprecht B II, 23° C.) | 3.0 g |
| | 25% aqueous ammonia solution | 1.0 g |
| | commercial defoaming agent based on silicone oil | 3.0 g |
| b. | titanium dioxide (grain size 0.2 to 0.4 μm) | 175.0 g |
| c. | 1,2-propylene glycol | 10.0 g |
| d. | dispersion according to Example 1 | 710.0 g |
| e. | butyl diglycol acetate | 10.0 g |
| | 1,2-propylene glycol | 27.0 g |

The components of a) are at first introduced into a stirring vessel in the above order. Thereafter substance b) is dispersed in this mixture by means of a dissolver, and substance c) is added to the resulting mixture. After adding substance d), mixture e) is finally slowly introduced, while stirring.

What is claimed is:

1. A vinyl copolymer having acetylacetoxy groups, which contains units of formula (I)

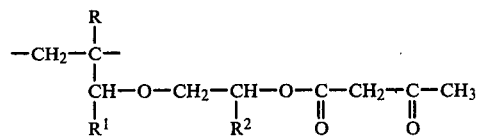

and/or of formula (II)

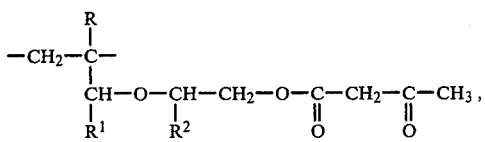

in which R is a hydrogen atom or a methyl group, $R^1$ is a hydrogen atom or an alkyl group having 1, 2 or 3 carbon atoms, and $R^2$ is a hydrogen atom or a hydrocarbon radical having from 1 to 8 carbon atoms and optionally containing one or several oxygen atoms or a halogen atom.

2. A vinyl copolymer which contains units of formula (III)

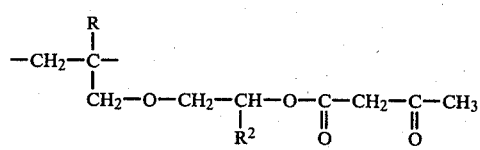

and/or of formula (IV)

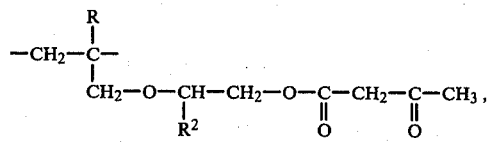

in which R is a hydrogen atom or a methyl group, and $R^2$ is (a) a hydrogen atom, (b) an alkyl group having 1, 2 or 3 carbon atoms, which may be substituted by a halogen atom, a hydroxyl radical, an acyloxy radical having from 3 to 6 carbon atoms or an acetylacetoxy group, or (c) an aryl radical having 6, 7 or 8 carbon atoms.

3. Process for the preparation of a vinyl copolymer by polymerizing a polymerizable acetylacetoxy compound together with at least one further copolymerizable olefinically unsaturated compound, which comprises reacting as acetylacetoxy compound an acetylacetoxyalkyl-allyl ether of formula (V)

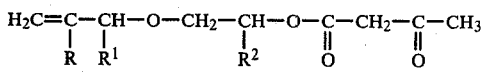

or of the formula (VI)

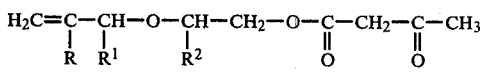

or a mixture of these ethers, in which R, $R^1$ and $R^2$ are defined as in formula (I), with at least one olefinically unsaturated compound wherein said polymer contains units of the compounds of the formula V or VI.

4. The process of claim 3, which comprises carrying out the polymerization in aqueous emulsion at a temperature of from 20° to 100° C. in the presence of a catalyst and optionally in the presence of an emulsifier and a protective colloid.

5. Aqueous plastics dispersion containing a vinyl polymer, an emulsifier and a protective colloid, wherein the vinyl polymer is a vinyl polymer as claimed in claim 1.

* * * * *